United States Patent
Harris et al.

(12) 
(10) Patent No.: US 11,560,799 B1
(45) Date of Patent: Jan. 24, 2023

(54) CERAMIC MATRIX COMPOSITE VANE ASSEMBLY WITH SHAPED LOAD TRANSFER FEATURES

(71) Applicants: Rolls-Royce High Temperature Composites Inc., Cypress, CA (US); Rolls-Royce plc, London (GB)

(72) Inventors: Stephen Harris, Cypress, CA (US); Michael J. Whittle, Derby (GB)

(73) Assignees: Rolls-Royce High Temperature Composites Inc., Cypress, CA (US); Rolls-Royce plc

( * ) Notice: Subject to any disclaimer, the term of this patent is extended or adjusted under 35 U.S.C. 154(b) by 0 days.

(21) Appl. No.: 17/508,342

(22) Filed: Oct. 22, 2021

(51) Int. Cl.
*F01D 5/14* (2006.01)
*F01D 5/18* (2006.01)
*F01D 9/04* (2006.01)
*F01D 5/28* (2006.01)

(52) U.S. Cl.
CPC .............. *F01D 5/147* (2013.01); *F01D 5/18* (2013.01); *F01D 5/282* (2013.01); *F01D 5/284* (2013.01); *F01D 9/041* (2013.01); *F01D 9/042* (2013.01); *F05D 2240/12* (2013.01); *F05D 2260/30* (2013.01); *F05D 2300/6033* (2013.01)

(58) Field of Classification Search
CPC . F01D 5/147; F01D 5/18; F01D 9/041; F01D 9/042; F01D 9/04; F05D 2240/12
See application file for complete search history.

(56) References Cited

U.S. PATENT DOCUMENTS

| | | |
|---|---|---|
| 3,066,911 A | 12/1962 | Anderson et al. |
| 5,630,700 A | 5/1997 | Olsen et al. |
| 6,164,903 A | 12/2000 | Kouris |
| 6,325,593 B1 | 12/2001 | Darkins, Jr. et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 7,452,182 B2 | 11/2008 | Vance et al. |
| 7,452,189 B2 | 11/2008 | Shi et al. |
| 7,722,317 B2 | 5/2010 | Schiavo et al. |
| 7,762,766 B2 | 7/2010 | Shteyman et al. |
| 7,824,152 B2 | 11/2010 | Morrison |
| 8,210,803 B2 | 7/2012 | Schaff et al. |
| 8,251,652 B2 | 8/2012 | Campbell et al. |
| 8,292,580 B2 * | 10/2012 | Schiavo ................. F01D 9/041 416/96 A |
| 8,454,303 B2 | 6/2013 | Garcia-Crespo |
| 8,956,105 B2 | 2/2015 | Uskert et al. |
| 9,097,141 B2 | 8/2015 | Paradis |
| 9,335,051 B2 | 5/2016 | Jarmon et al. |

(Continued)

FOREIGN PATENT DOCUMENTS

| | | |
|---|---|---|
| EP | 3121379 | 1/2017 |
| JP | 2004076601 | 3/2004 |

*Primary Examiner* — Michael L Sehn
(74) *Attorney, Agent, or Firm* — Barnes & Thornburg LLP

(57) ABSTRACT

A turbine vane assembly adapted for use in a gas turbine engine includes a spar, a turbine vane, and load transfer pins. The spar comprises metallic materials and is configured to support other components of the turbine vane assembly relative to an associated turbine case. The turbine vane comprises ceramic matrix composite materials and is shaped to include an airfoil configured to direct the flow of hot gasses through a primary gas path of the turbine vane assembly.

12 Claims, 2 Drawing Sheets

(56) References Cited

U.S. PATENT DOCUMENTS

| | | |
|---|---|---|
| 9,546,557 B2 | 1/2017 | Grooms, III et al. |
| 9,915,159 B2 | 3/2018 | Huizenga et al. |
| 10,174,619 B2 | 1/2019 | Uskert et al. |
| 10,174,627 B2 | 1/2019 | Chang et al. |
| 10,808,560 B2 * | 10/2020 | Sippel .................... F01D 9/065 |
| 2008/0053107 A1 | 3/2008 | Weaver et al. |
| 2009/0193657 A1 | 8/2009 | Wilson et al. |
| 2010/0068034 A1 | 3/2010 | Schiavo et al. |
| 2014/0234118 A1 | 8/2014 | Beaujard et al. |
| 2014/0255174 A1 | 9/2014 | Duelm et al. |
| 2016/0123163 A1 | 5/2016 | Freeman et al. |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2016/0290147 A1 | 10/2016 | Weaver |
| 2017/0022833 A1 | 1/2017 | Heitman et al. |
| 2017/0051619 A1 | 2/2017 | Tuertscher |
| 2017/0298748 A1 | 10/2017 | Vetters et al. |
| 2018/0045117 A1 | 2/2018 | Groves, II et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |
| 2020/0362709 A1 | 11/2020 | Whittle |

* cited by examiner

CERAMIC MATRIX COMPOSITE VANE ASSEMBLY WITH SHAPED LOAD TRANSFER FEATURES

FIELD OF THE DISCLOSURE

The present disclosure relates generally to vane assemblies for gas turbine engines, and more specifically to vane assemblies that comprise ceramic matrix composite components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly adapted for use in a gas turbine engine may include a metallic spar, a turbine vane, and load transfer pins. The metallic spar may extend radially inwardly relative to an associated turbine case arranged around a central reference axis. The metallic spar may be configured to support other components of the turbine vane assembly relative to the associated turbine case. The turbine vane comprising ceramic matrix composite materials may be supported by the metallic spar. The load transfer pins may couple the turbine vane to the metallic spar.

In some embodiments, at least one aperture in the turbine vane may be shaped to extend non-linearly relative the central axis. The shape of the aperture(s) may drive complex movement of the corresponding mount pin relative to the turbine vane due to different amounts of thermal growth caused by material mismatch during operation of the gas turbine engine at various temperatures.

In some designs, the shape of the aperture(s) may drive pre-load being applied to the turbine vane by the metallic support structure when the turbine vane assembly is at ambient temperatures. These preloads may be selected so as to manage or minimize the loading and deflection of the airfoil caused by aerodynamic loading of the turbine vane during use in the gas turbine engine.

In some embodiments, the aperture(s) may be shaped to have a radial and a circumferential component. In some designs, the aperture(s) may have an arcuate shape when viewed in the circumferential direction about the central reference axis.

These and other features of the present disclosure will become more apparent from the following description of the illustrative embodiments.

DETAILED DESCRIPTION OF THE DRAWINGS

Figure 1:
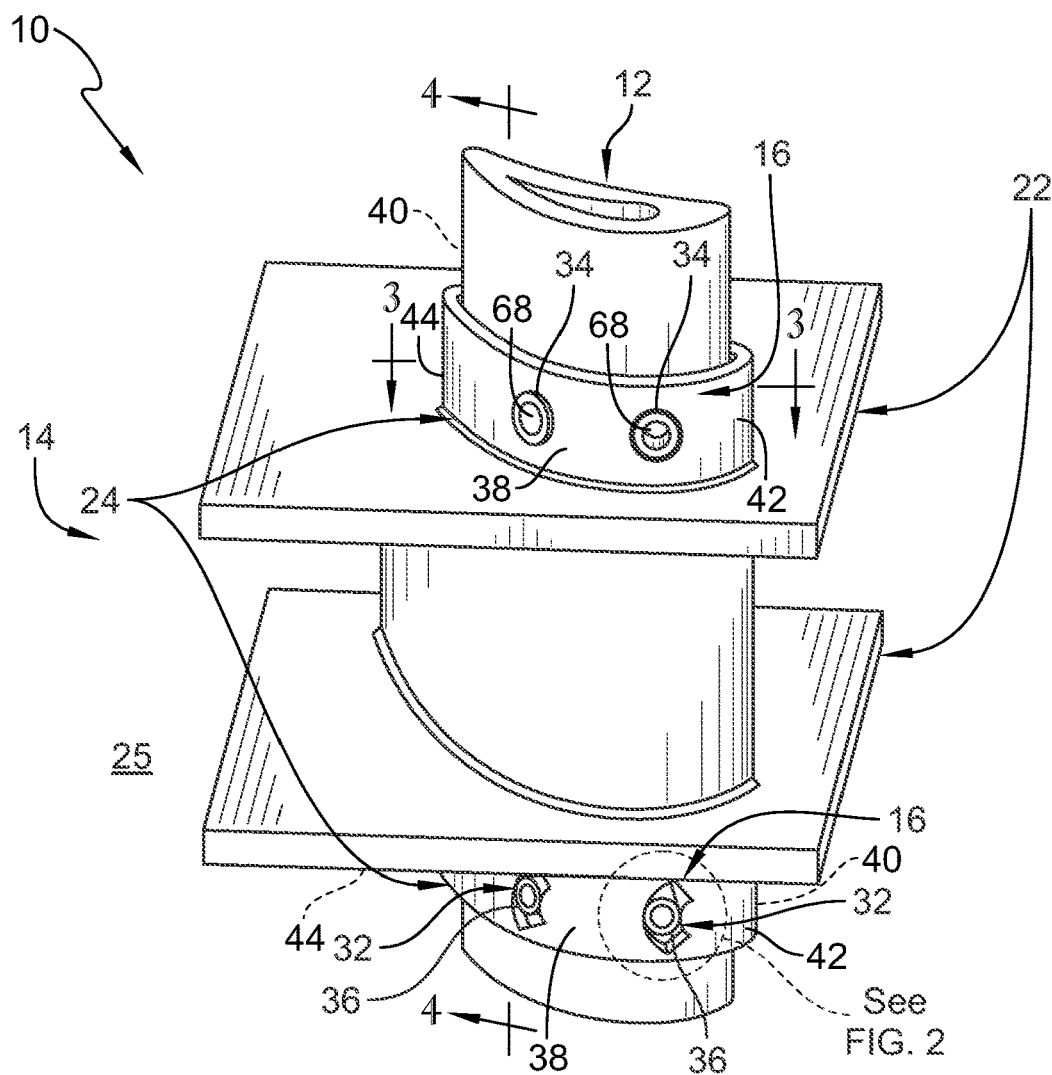
FIG. 1 is a perspective view of a turbine vane assembly adapted for use in a gas turbine engine showing the turbine vane assembly includes a metallic spar, a turbine vane supported by the metallic spar, and load transfer pins that couple the turbine vane to the spar and extend through vane mounts of the turbine vane at both radially inner and outer ends of the vane to transfer loads from the vane to the spar.

For the purposes of promoting an understanding of the principles of the disclosure, reference will now be made to a number of illustrative embodiments illustrated in the drawings and specific language will be used to describe the same.

A turbine vane assembly 10 according to the present disclosure is adapted for use in a gas turbine engine as shown in FIGS. 1-5. The turbine vane assembly includes a spar 12, a turbine vane 14, and load transfer pins 16 as shown in FIG. 1. The spar 12 extends radially inwardly relative to an associated turbine case arranged around a central reference axis. The turbine vane 14 is shaped to define a passageway 18 extending radially therethrough and is supported by the metallic spar 12 that extends through the passageway 18. The load transfer pins 16 couple the turbine vane 14 to the metallic spar 12 via apertures 30, 32 that may be shaped to induce pre-load into the turbine vane 14 under certain conditions so as to address aero loads applied to the turbine vane 14 during use in the gas turbine engine.

The spar 12 comprises metallic materials while the turbine vane 14 comprises ceramic matrix composite materials. The ceramic matrix composite vane 14 is adapted to withstand high temperatures, but may have a relatively low strength compared the metallic spar 12. The spar 12 is therefore configured to support other components of the turbine vane assembly 10, like the ceramic matrix composite turbine vane 14, relative to the associated turbine case and carry any aerodynamic loads from the turbine vane 14.

Metallic materials of the spar 12 and ceramic matrix composite materials of the turbine vane 14 grow and shrink at different rates when exposed to high/low temperatures. More specifically, metallic materials have coefficients of thermal expansion much higher than those of ceramic matrix composites. To accommodate this difference, the turbine vane 14 is shaped to allow radial movement (sliding) of the corresponding load transfer pins 16 that couple the turbine vane 14 to the spar 12 during operation of the turbine vane assembly 10 at various temperatures.

The turbine vane 14 includes an airfoil 20, panels 22, and vane mounts 24 as shown in FIGS. 1 and 4. The airfoil 20 is configured to direct the flow of hot gasses through a primary gas path 25 of the turbine vane assembly 10. The panels 22 each extend circumferentially from the airfoil 20 away from the passageway 18 through the turbine vane 14 to define the primary gas path 25 across the turbine vane assembly 10. The vane mounts 24 are each arranged radially outward/inward of the primary gas path 25.

The vane mounts 24 include an outer vane mount 26 and an inner vane mount 28 as shown in FIG. 4. The outer vane mount 26 is arranged radially outward of the primary gas path 25 and the inner vane mount 28 is arranged radially inward of the primary gas path 25.

Each of the vane mounts 26, 28 includes apertures 30, 32 that receive the load transfer pins 16 as shown in FIGS. 1-2 and 4-5. The outer vane mount 26 includes outer apertures 30 and the inner vane mount 28 includes inner apertures 32. In the illustrative embodiments, one of the outer apertures 30 and the inner apertures 32 are sized to allow radial movement of the corresponding load transfer pins 16 to create the sliding support that transfers loading of the turbine vane 14 to the metallic spar 12 while accounting for materials mismatch of the metallic spar 12 and the turbine vane 14 during operation of the turbine vane assembly 10 at various temperatures.

The load transfer pins 16 include outer mount pins 34 and inner mount pins 36 as shown in FIGS. 1-5. The outer mount pin 34 extends away from the spar 12 and through the outer aperture 30 in the outer vane mount 26 of the turbine vane 14. The inner mount pin 36 that extends away from the spar 12 and through the inner aperture 32 in the inner vane mount 28 of the turbine vane 14. In other embodiments, the load transfer pins 16 may also be used to couple the turbine vane 14 to other types of metallic support structures (inner collars, turbine case, flanges, etc.).

Figures 2, 2A:
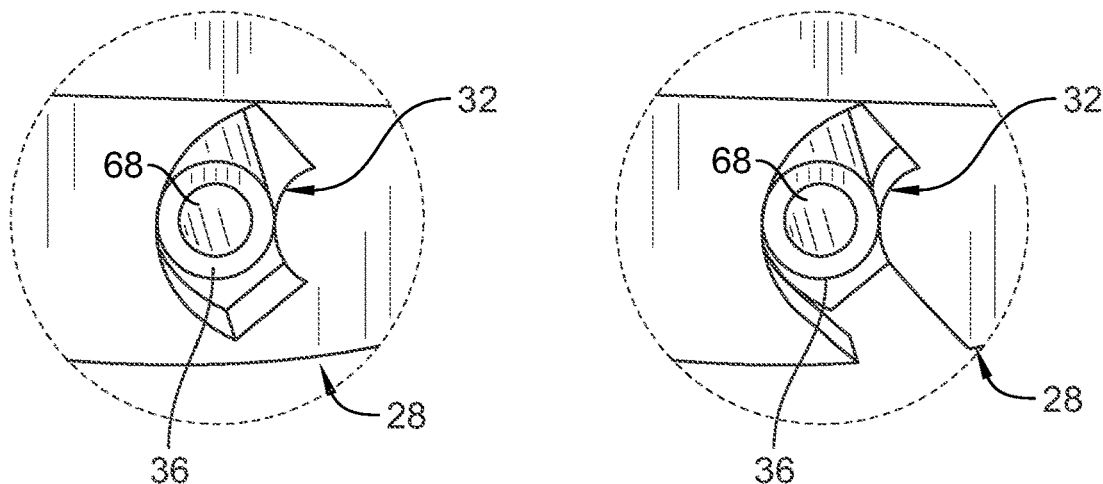
FIG. 2 is a detail view of the turbine vane assembly of FIG. 1 showing the inner vane mount of the turbine vane includes inner apertures manufactured as closed-end slots that are shaped to extend non-linearly relative the central axis to drive complex movement of the corresponding mount pin relative to the turbine vane due to thermal growth during operation of the gas turbine engine at various temperatures thereby providing the ability to manage pre-loading and aerodynamic loading of the ceramic matrix composite material of the turbine vane.
FIG. 2A is a detail view of an alternative portion of the turbine vane assembly of FIG. 1 showing the inner vane mount of the turbine vane includes inner apertures manufactured as open-end slots that are shaped to extend non-linearly relative the central axis to drive complex movement of the corresponding mount pin relative to the turbine vane due to thermal growth during operation of the gas turbine engine at various temperatures thereby providing the ability to manage pre-loading and aerodynamic loading of the ceramic matrix composite material of the turbine vane.

In the illustrative embodiment, the inner apertures 32 are shaped to allow radial movement of the corresponding inner mount pins 36 and to induce pre-load into the turbine vane 14 under certain conditions as suggested in FIGS. 1 and 2. The outer apertures 30 are sized to block radial movement of the corresponding outer mount pins 34 so as to fix the turbine vane 14 in place radially relative to the metallic spar 12 at the outer mount pins 34. In other embodiments, the outer apertures 30 may be sized to allow radial movement of the corresponding outer mount pins 34 and/or to contribute to pre-loading.

In the illustrative embodiment of FIG. 2, each of the inner apertures 32 sized to allow radial movement of the corresponding inner mount pins 36 has an enclosed arcuate shape. More generally, the inner apertures 32 have radial and circumferential components to their shape. In some embodiments, the inner apertures 32 can have axial components as part of the complex shape developed. The illustrated apertures 32 have an arcuate C-shape when viewed in the circumferential direction about the central reference axis. The enclosed arcuate shape sets limits on relative radial length change of the metallic spar 12 relative to the turbine vane 14. In the illustrative embodiment of FIG. 2A, each of the inner apertures 32 sized to allow radial movement of the corresponding inner mount pins 36 is provided by a radially open-ended arcuate slot 32.

The shape of the apertures 32 extends non-linearly relative the central axis. The shape of the apertures 32 drives complex, or multi-directional, movement of the corresponding mount pin 16 relative to the turbine vane 14 due to different amounts of thermal growth caused by material mismatch during operation of the gas turbine engine at various temperatures.

The shape of the apertures 30, 32 may drive pre-load being applied to the turbine vane 14 by the metallic support structure when the turbine vane assembly is at ambient temperatures. These preloads may be selected so as to manage or minimize the loading and deflection of the airfoil caused by aerodynamic loading of the turbine vane 14 during use in the gas turbine engine.

Figure 3:
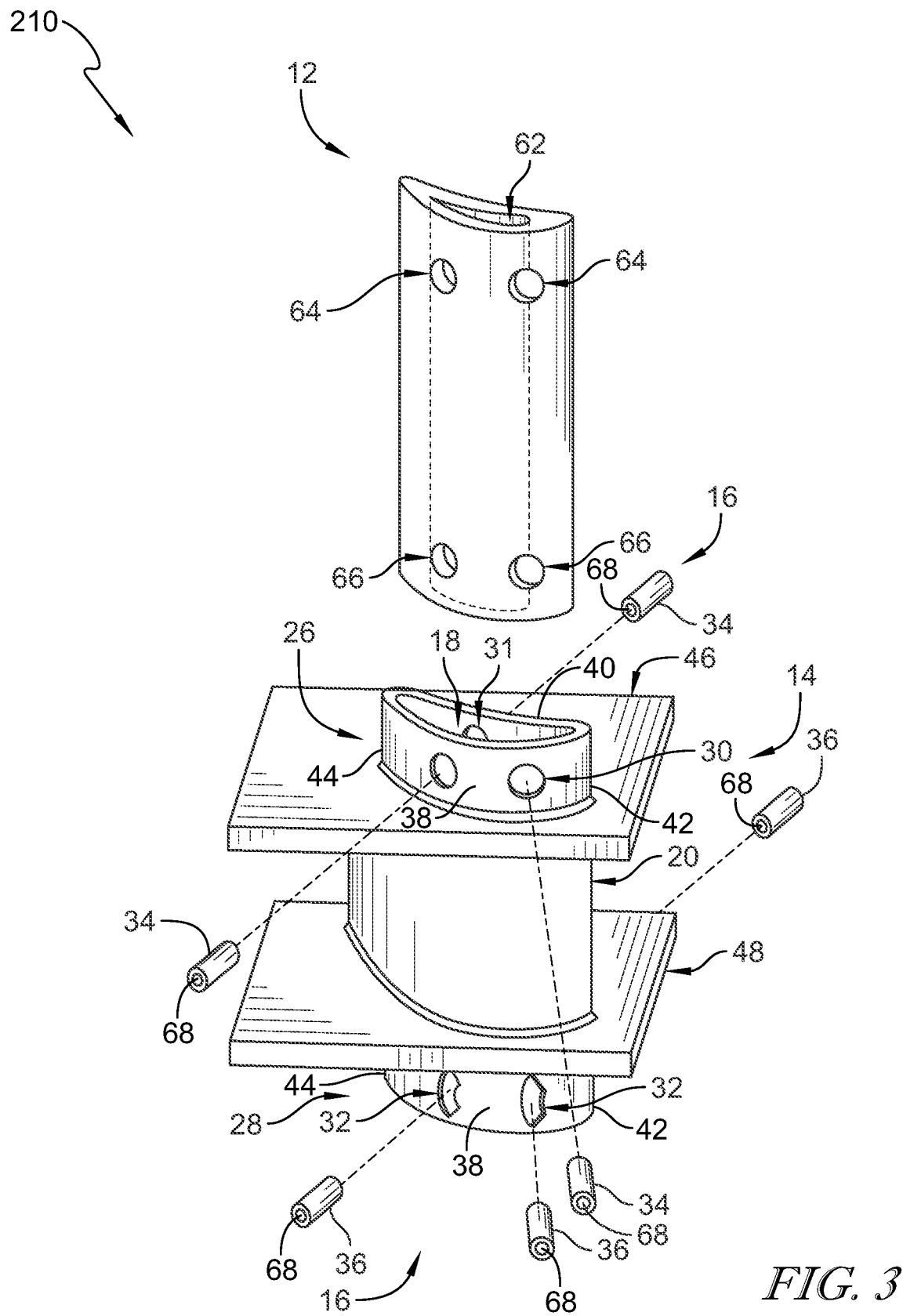
FIG. 3 is an exploded view of the turbine vane assembly of FIG. 1 showing the spar includes inner and outer apertures that are configured to engage with the outer and inner mount pins.

The vane mounts 24 are also shaped to include a pressure side wall 38, a suction side wall 40, a leading edge 42, and a trialing edge 44 as shown in FIG. 3. The suction side 40 wall is spaced apart circumferentially from the pressure side wall 38. The pressure side 38 wall and the suction side wall 40 extend axially between and interconnect the leading edge 42 and the trailing edge 44.

In some embodiments, the apertures 30, 32 may instead by blind features or blind holes. The blind holes may extend into the side walls 38, 40 of the outer and inner vane mounts 26, 28, so that the pins 16 may engage the blind feature and the side walls 38, 40, not just the side walls 38, 40 of the vane mounts 26, 28.

In the illustrative embodiments, the outer apertures 30 and the inner apertures 32 extend through one of the pressure side wall 38 and the suction side wall 40 and open into the passageway 18. Each of the load transfer pins 16 extend through one of the pressure side wall 38 and suction side wall 40 of one of the outer vane mount 26 and the inner vane mount 28 and into the spar 12.

In the illustrative embodiment, the outer vane mount 26 includes suction side apertures 30 and a pressure side aperture 31 as shown in FIGS. 3 and 4. The suction side apertures 30 extend through the suction side wall 40 of the outer vane mount 26. The pressure side aperture 31 extends through the pressure side wall 38 of the outer vane mount 26.

In the illustrative embodiment, the outer vane mount 26 includes suction side apertures 32 and a pressure side aperture 33 as suggested in FIG. 4 The suction side apertures 32 extend through the suction side wall 40 of the inner vane mount 28. The pressure side aperture 33 extends through the pressure side wall 38 of the inner vane mount 28.

In the illustrative embodiment, the outer vane mount 26 and the inner vane mount 28 each include only three apertures 30, 32. In other embodiments, the mounts 26, 28 may each include more than three apertures 30, 32. In other embodiments, the outer vane mount 26 may include a different number of apertures 30 than the inner vane mount 28 and vice versa.

The panels 22 include an outer panel 46 and an inner panel 48 as shown in FIGS. 4 and 5. Each of the panels 46, 48 extends circumferentially from the airfoil 20 away from the passageway 18 through the turbine vane 14 to define the primary gas path 25 across the turbine vane assembly 10.

The outer panel 46 is arranged radially inward of the outer vane mount 26 and the inner panel 48 is arranged radially outward of the inner vane mount 28.

In the illustrative embodiment, the turbine vane 14 is a one-piece component. The airfoil 20, the outer vane mount 26, the inner vane mount 28, the outer panel 46, and the inner panel 48 are integrated into a single piece of ceramic matrix composite material that has been co-infiltrated with ceramic matrix material. In other embodiments, the airfoil 20, the panels 22, and the vane mounts 24 are formed as separate components.

Turning again to the spar 12, the spar 12 is shaped to include a cooling air duct 62, outer pin receivers 64, and inner pin receivers 66 as shown in FIG. 5. The cooling air duct 62 extends radially through the spar 12. Each of the outer pin receivers 64 extend through the spar 12 at a radially outer end of the spar 12 and open into the air duct 62. Each of the inner pin receivers 66 extend through the spar 12 at a radially inner end of the spar 12 and open into the air duct 62. In other embodiments, the pin receivers 64, 66 may only extend partway into the spar 12.

In the illustrative embodiment, the spar 12 is arranged to extend radially through the passageway 18 of the vane 14 such that the outer and inner pin receivers 64, 66 align with the outer and inner apertures 30, 32 of the vane mounts 26, 28 as shown in FIG. 4. Each of the outer mount pins 34 extends through the outer aperture 30 of the outer vane mount 26 and into the outer pin receiver 64 of the spar 12. Each of the inner mount pins 36 extends through the inner aperture 32 of the inner vane mount 28 and into the inner pin receiver 66 of the spar 12.

In the illustrative embodiment, the outer and inner pin receivers 64, 66 are sized to receive the outer and inner mount pins 34, 36 so as to fix the pins 16 in place and couple the pins 16 to the metallic spar 12. The outer mount pins 34 extend into the outer pin receiver 64 and inner pins 36 extend into the inner pin receivers 66 of the spar 12 to couple to the spar 12.

It is also contemplated that the spar 12 may be omitted and that other metallic support structures may be used to couple the turbine vane 14 to the turbine case. In some embodiments where the spar is omitted, a collar support arrangement may be used to couple the turbine vane 14 to the turbine case. The load transfer pins 16 may extend through that collar support arrangement and engage the turbine vane mounts 26, 28 of the turbine vane 14 to couple the vane 14 to the case and transfer the loads applied to the vane 14 to the turbine case. In other embodiments, an inner load transfer collar may be used to transmit forces at the radially inner load transfer pins 36. The inner load transfer collar may be attached to the spar 12 or may be supported by interspersed metallic vanes.

In the illustrative embodiment, the load transfer pins 16 are made from metallic materials and are mechanically fastened or joined to the metallic spar 12. In other embodiments, the load transfer pins 16 may be made of non-metallic materials to better match the ceramic matrix composite materials coefficient of thermal expansion and improve chemically compatibility.

Each of the load transfer pins 16 includes a through hole 68 as shown in FIGS. 3 and 4. The through hole 68 extends through the length of the pin 16. In the illustrative embodiment, the through hole 68 opens into the passageway 18 of the vane 14.

In some embodiments, the through holes 68 may be used to supply cooling air to the cooling air duct 62 of the spar 12 and transit flow to feed other cavities with the cooling air. In other embodiments, the through holes 68 of the pins 16 may be used to cool the pins 16 and reduce the temperature of the contact between the ceramic vane 14 and the load transfer pins 16. In some embodiments, the spar 12 may be also be formed to include one or more cooling air impingement holes to allow cooling air from a secondary air system to flow through the spar 12 and cool the ceramic matrix composite material of the vane 14.

In the illustrative embodiments, the load transfer pins 16 are circular is shape when viewed in cross-section. In other embodiments, the pins 16 may be another suitable shape, such as ovular.

In some embodiments, some of the load transfer pins 16 may have a smaller diameter than the other load transfer pins 16. The larger diameter pins 16 may be configured to datum the vane 14 and engage the apertures 30, 32 upon assembly. The smaller diameter pins 16 may be configured to transfer the loading and engage upon loading of the vane 14 during use of the assembly 10 thereby driving orientation and/or stress in the vane 14 based on both pin 16 size and aperture 30, 32 shape.

The present disclosure teaches a turbine vane assembly 10 that manages the coefficient of thermal expansion mismatch between the metallic support structure 12 and the ceramic matrix composite vane 14. The turbine vane assembly 10 accounts for the relative thermal growth mismatch due to differences in coefficients of thermal expansion (CTE) between the ceramic matrix composite vane 14 and the metallic support structure 12. More specifically, different radial growth of these components is addressed through the application of compliance through appropriately shaped sliding features 16. In other ceramic matrix composite vane arrangements, this material mis-match can sometimes accounted for by using a spring or other compliant feature.

Variation in coefficients of thermal expansion between ceramic matrix composites and metallic spars necessitate features that allow for radial movement while still enabling transfer of aerodynamic loads from the ceramic matrix composite to the spar. These aero loads, particularly at higher temperatures, can result in undesirable deformation of the ceramic matrix composite that results in reduced aero performance. Aero loads, temperatures and axial elongation all tend to increase with increasing thrust and thus it is feasible to apply a preload to the ceramic matrix composite by controlling the shape of the slots 30, 32 of the transfer feature 16, and thus minimizing the aerodynamic deflection.

This effect can be exploited in isolation to minimise ceramic matrix composite stresses or in combination with other parts in the assembly for example with a Chordal clamp seal whereby, the stress in the metallic part is reduced, minimising creep concerns. Optionally, the sliding features 16 have apertures 30, 32 shaped to tailor the orientation of ceramic matrix composite aerofoils 20 at different points across the flight cycle (i.e. during engine startup, takeoff, and cruise modes) to provide for better control of turbine capacity.

In the illustrative embodiments, the load from vanes 14 transmitted outboard to the high-pressure turbine casing. In metallic embodiments, the turbine vane assembly structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the aerodynamic loading at both the inner and outer extents of the vane 14. The load may be transmitted from the vane 14 through a metallic structure or spar 12 out into the casing. However, the ceramic matrix composite material has a significantly lower coefficient of thermal expansion compared to the high temperature metals of the spar 12. Therefore, the components of the turbine vane assembly 10 has a significant mismatch in radial height between cold build and the hottest operating conditions.

In the illustrative embodiments, the turbine vane assembly 10 transfers the aerodynamic loading imparted on the ceramic matrix composite vane 14 through a series of load pins 16 arranged in apertures 30, 32. The apertures 30, 32 may be arranged on the suction surface of the vane 14 and may sit on either side of the resultant aerodynamic load vector. The locations of the apertures 30, 32 may be optimized to equally share loading at each aperture 30, 32.

The apertures 30, 32 may also be arranged on pressure side of the vane 14. The apertures 30, 32 on the pressure side prevents rotation of the vane 14, 214, 314 and maintains stability of the structure 12.

The location of the apertures 30, 32 may be chosen such that each aperture 30, 32 is always on the same side of the aerodynamic lift vector throughout the engine running range. In this way, there is no unloading or reversal of loading when the pressure distribution varies. Additionally, the distance from the vector to the apertures 30, 32 may be small, but measureable as the larger it is, the larger the moment becomes and therefore, the larger the stress in the ceramic matrix composite vane 14, and pin 16.

In the illustrative embodiments, three load transfer pins 16 are used at each radial end of the vane 14. In other embodiments, the vane assembly 10 may include more than three load pins 16, especially if three of the pins 16 are used to datum the ceramic matrix composite vane 14 relative to the support structure 12 and transfer loading. The remaining pins 16 may be used solely to transfer loading. The sole load transfer pins 16 may be undersized pins 16 that would engage upon loading, while the datum pins 16 engage on assembly.

In the illustrative embodiments, the load transfer pins 16 may comprise alumina or other non-metallic material. The pins 16 may provide a friendly ceramic matrix composite load transfer feature.

In the illustrative embodiments, the pins 16 may also be hollow. The through holes 68 may be provided cooling flows to reduce the temperature of the contact between the pins 16 and the vane 14.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted to be mounted around an axis of rotation in a gas turbine engine, the assembly comprising
    a metallic spar that extends radially inwardly relative to an associated turbine case arranged around a central reference axis, the metallic spar being configured to support other components of the turbine vane assembly relative to the associated turbine case,
    a turbine vane comprising ceramic matrix composite materials that is supported by the metallic spar, the turbine vane shaped to include an airfoil configured to direct the flow of hot gasses through a primary gas path of the turbine vane assembly, an outer vane mount arranged radially outward of the primary gas path, and an inner vane mount arranged radially inward of the primary gas path, wherein the turbine vane is shaped to define a passageway extending radially therethrough and the metallic spar extends from a radially outer end of the turbine vane to a radially inner end of the turbine vane, and
    load transfer pins that couple the turbine vane to the metallic spar, the load transfer pins including an outer mount pin that extends away from the metallic spar and through an outer aperture in the outer vane mount of the turbine vane and an inner mount pin that extends away from the metallic spar and through an inner aperture in the inner vane mount of the turbine vane,
    wherein one of the outer aperture and the inner aperture is shaped to provide a slot that is non-linear with at least a portion that is not parallel to a ray extending radially outward from the central axis such that the slot is configured to guide multi-directional movement of the corresponding outer mount pin or inner mount pin relative to the turbine vane driven by different amounts of thermal growth caused by material mismatch during operation of the gas turbine engine at various temperatures.

2. The assembly of claim 1, wherein the slot is configured to drive pre-load being applied to the turbine vane by the metallic support structure when the turbine vane assembly is at ambient temperatures so as to manage the loading and deflection of the airfoil caused by aerodynamic loading of the turbine vane during use in the gas turbine engine.

3. The assembly of claim 2, wherein the slot is shaped to have a radial and a circumferential component along an exterior of the turbine vane.

4. The assembly of claim 2, wherein the inner aperture is sized to allow radial movement of the corresponding inner mount pin and the outer aperture is sized to block radial movement of the corresponding outer mount pin so as to fix the turbine vane in place radially relative to the metallic spar at the outer mount pin.

5. The assembly of claim 2, wherein the turbine vane is shaped to further include an outer panel and an inner panel that each extend circumferentially from the airfoil away from the passageway through the turbine vane to define the primary gas path across the turbine vane assembly, the outer panel is arranged radially inward of the outer vane mount, and the inner panel is arranged radially outward of the inner vane mount.

6. The assembly of claim 5, wherein the inner aperture is sized to allow radial movement of the corresponding inner mount pin and the outer aperture is sized to block radial movement of the corresponding outer mount pin so as to fix the turbine vane in place radially relative to the metallic spar at the outer mount pin.

7. A turbine vane assembly adapted to be mounted around an axis of rotation in a gas turbine engine, the assembly comprising
    a metallic spar that extends radially inwardly relative to an associated turbine case arranged around a central reference axis, the metallic spar being configured to support other components of the turbine vane assembly relative to the associated turbine case,
    a turbine vane comprising ceramic matrix composite materials that is supported by the metallic spar, the turbine vane shaped to include an airfoil configured to direct the flow of hot gasses through a primary gas path of the turbine vane assembly, an outer vane mount arranged radially outward of the primary gas path, and an inner vane mount arranged radially inward of the primary gas path, wherein the turbine vane is shaped to define a passageway extending radially therethrough and the metallic spar extends from a radially outer end of the turbine vane to a radially inner end of the turbine vane, and load transfer pins that couple the turbine vane to the metallic spar, the load transfer pins including an outer mount pin that extends away from the metallic spar and through an outer aperture in the outer vane mount of the turbine vane and an inner mount pin that extends away from the metallic spar and through an inner aperture in the inner vane mount of the turbine vane, wherein the one of the outer aperture and the inner aperture has an arcuate shape when viewed in the circumferential direction about the central reference axis.

8. A turbine vane assembly adapted to be mounted around an axis of rotation in a gas turbine engine, the assembly comprising a metallic spar that extends radially inwardly relative to an associated turbine case arranged around a central reference axis, the metallic spar being configured to support other components of the turbine vane assembly relative to the associated turbine case, a turbine vane comprising ceramic matrix composite materials that is supported by the metallic spar, the turbine vane shaped to include an airfoil configured to direct the flow of hot gasses through a primary gas path of the turbine vane assembly, an outer vane mount arranged radially outward of the primary gas path, and an inner vane mount arranged radially inward of the primary gas path, wherein the turbine vane is shaped to define a passageway extending radially therethrough and the metallic spar extends from a radially outer end of the turbine vane to a radially inner end of the turbine vane, and load transfer pins that couple the turbine vane to the metallic spar, the load transfer pins including an outer mount pin that extends away from the metallic spar and through an outer aperture in the outer vane mount of the turbine vane and an inner mount pin that extends away from the metallic spar and through an inner aperture in the inner vane mount of the turbine vane, wherein the one of the outer aperture and the inner aperture is provided by a radially open-ended slot.

9. A turbine vane assembly, the assembly comprising
a metallic support structure adapted to be coupled to a turbine case that has a length that extends radially relative a central reference axis, a turbine vane comprising ceramic matrix composite materials shaped to include an airfoil that extends radially across a primary gas path of the turbine vane assembly, an outer vane mount arranged radially outward of the primary gas path, and an inner vane mount arranged radially inward of the primary gas path, and load transfer pins including (i) an outer pin that extends from the metallic support structure and into an outer aperture in the outer vane mount of the turbine vane and (ii) an inner mount pin that extends from the metallic support structure and into an inner aperture in the inner vane mount of the turbine vane, wherein one of the outer aperture and the inner aperture has a non-linear shape that provides a slot with at least a portion that is not parallel to a ray extending radially outward from the central axis.

10. The assembly of claim 9, wherein the slot is configured to drive pre-load being applied to the turbine vane by the metallic support structure when the turbine vane assembly is at ambient temperatures.

11. The assembly of claim 9, wherein the slot is shaped to have a radial and a circumferential component.

12. The assembly of claim 9, wherein the slot is configured to drive orientation of the aerofoil to a preselected location based on thermal conditions associated with a flight cycle mode to thereby influence turbine capacity during the flight cycle mode.

* * * * *